United States Patent [19]
Davin et al.

[11] Patent Number: 5,172,386
[45] Date of Patent: Dec. 15, 1992

[54] DYE LASER AMPLIFIER INCLUDING A SPECIFICALLY DESIGNED DIFFUSER ASSEMBLY

[75] Inventors: James Davin, Gilroy; James P. Johnston, Stanford, both of Calif.

[73] Assignee: The United States of America as represented by the Department of Energy, Washington, D.C.

[21] Appl. No.: 915,164

[22] Filed: Sep. 30, 1986

[51] Int. Cl.⁵ ............................................. H015 3/02
[52] U.S. Cl. ...................................... 372/53; 372/54; 359/333
[58] Field of Search ...................... 372/53, 54; 330/4.3

[56] References Cited

U.S. PATENT DOCUMENTS

| | | | |
|---|---|---|---|
| 3,451,007 | 6/1969 | Schimitscheck et al. | 372/54 |
| 3,688,216 | 8/1972 | Kocher et al. | 372/54 |
| 3,740,664 | 6/1973 | Itzkan | 372/54 |
| 3,872,403 | 3/1975 | Pilloff | 372/54 |
| 4,170,762 | 10/1979 | Mack et al. | 372/54 |
| 4,176,324 | 11/1979 | Aldag et al. | 372/54 |

*Primary Examiner*—Mark Hellner
*Attorney, Agent, or Firm*—Miguel A. Valdes; Henry P. Sartorio; William R. Moser

[57] ABSTRACT

A large (high flow rate) dye laser amplifier in which a continuous replenished supply of dye is excited by a first light beam, specifically a copper vapor laser beam, in order to amplify the intensity of a second different light beam, specifically a dye beam, passing through the dye is disclosed herein. This amplifier includes a dye cell defining a dye chamber through which a continuous stream of dye is caused to pass at a relatively high flow rate and a specifically designed diffuser assembly for slowing down the flow of dye while, at the same time, assuring that as the dye stream flows through the diffuser assembly it does so in a stable manner.

16 Claims, 2 Drawing Sheets

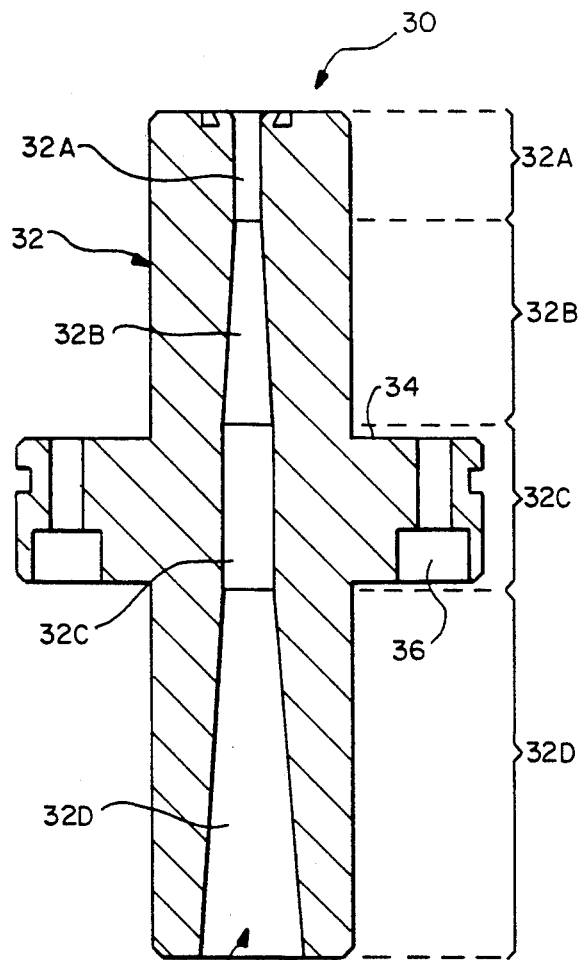
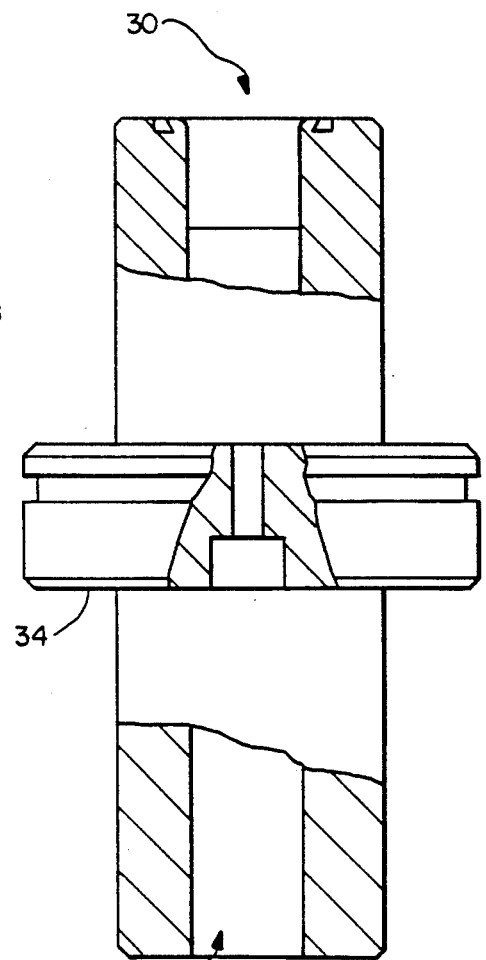
FIG.-2    FIG.-3
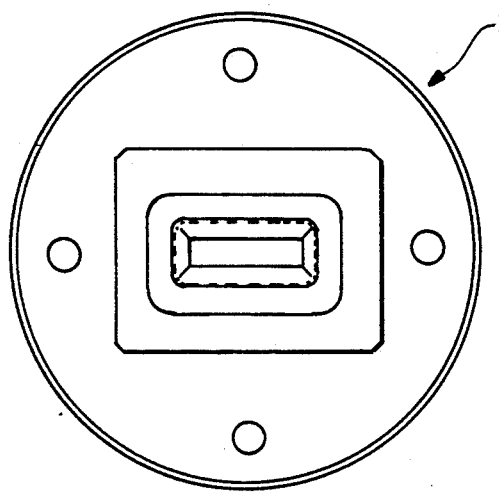
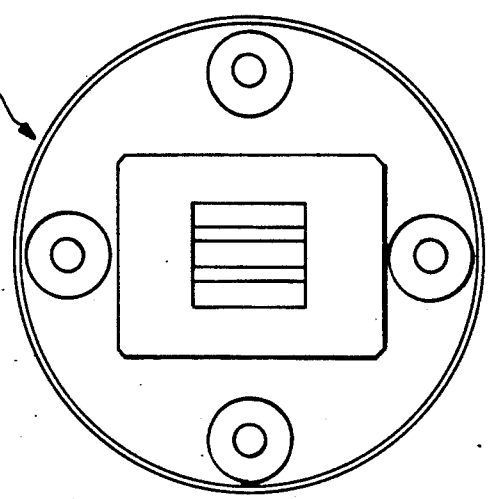
FIG.-4    FIG.-5

DYE LASER AMPLIFIER INCLUDING A SPECIFICALLY DESIGNED DIFFUSER ASSEMBLY

The United States Government has rights in this invention pursuant to Contract No. W-7405-ENG-48 between the U.S. Department of Energy and the University of California for the operation of the Lawrence Livermore National Laboratory.

BACKGROUND OF THE INVENTION

The present invention relates generally to a diffuser for slowing down the flow of a stream of liquid and more particularly to a specifically designed diffuser assembly for use in a dye laser amplifier of the type described in copending U.S. patent application Ser. No. 911,272, filed Sep. 22, 1986 and entitled DYE LASER AMPLIFIER INCLUDING A DYE CELL CONTAINED WITHIN A SUPPORT VESSEL and copending U.S. patent application Ser. No. 911,193, filed Sep. 22, 1986 and entitled DYE LASER AMPLIFIER INCLUDING A LOW TURBULENCE, STAGNATION-FREE DYE FLOW CONFIGURATION.

In each of the copending patent applications recited immediately above, both of which are incorporated herein by reference, a specifically configured dye laser amplifier is disclosed. This dye laser amplifier includes a dye cell assembly having an internal chamber in which a continuous replenished supply of dye solution of high velocity is excited by a first light beam in order to amplify the intensity of a second, different light beam passing through the dye. In an actual working embodiment, this apparatus operates at relatively high flow rates and the dye solution itself moves through the dye chamber at relatively high velocities. For example, the structure disclosed in the above-recited copending application is designed to operate at velocities greater than 170 feet/second, flow rates greater than 30 gallons/minute and pressures exceeding 150 psi. An apparatus of this type requires a diffuser at the outlet of its dye chamber in order to slow down the dye stream before the latter makes a turn within its internal plumbing. Because of the high flow rates and high velocities associated with the stream, the diffuser design is critical.

Heretofore, a typical diffuser assembly consisted of a generally tubular (rectangular cross section), axially extending diffuser body defining an axially extending passageway having a diverging cross section along its entire length, that is, from its upstream end to its downstream end. When such a design is utilized in a dye laser amplifier of the type contemplated herein, that is, one operated at relatively high flow rates and velocities, there is a tendency for the stream to separate from the internal wall of the diffuser as it flows through the latter. This results in a large pressure drop with its associated undesirable noise and vibration which is due to the high velocities and momentums associated with the flow of dye through the diffuser. As will be seen hereinafter, the present invention is directed to a particularly designed, uncomplicated and yet reliable diffuser, especially one suitable for large dye laser amplifiers, and specifically a diffuser through which the dye stream will flow without separating therefrom.

SUMMARY OF THE INVENTION

In view of the foregoing, it is an object of the present invention to provide a diffuser assembly which is especially designed in an uncomplicated and yet reliable way to appreciably slow down liquid flowing through the diffuser at relatively high velocities.

A more specific object of the present invention is to provide a diffuser assembly which is configured such that the fluid stream passing through it always remains fully attached thereto about the entire perimeter (circumference) of the stream, whereby to minimize noise and vibration within the diffuser assembly.

Another specific object of the present invention is to provide a diffuser assembly which is of the last-mentioned type but which is also especially suitable for use in a large dye laser amplifier.

As will be described in more detail hereinafter, the diffuser assembly disclosed herein is generally tubular (rectangular cross section) and extends axially, that is, on a straight line path. In accordance with the present invention, the assembly includes at least two tubular sections and preferably a greater plurality of sections in multiples of two's. Specifically, the diffuser includes a first upstream-most tubular section defining an axially extending inner passageway having a uniform cross section along its entire length and a second tubular section which is located immediately downstream from the first section and which defines an axially extending inner passageway having a diverging cross section along its entire length from its upstream end to its downstream end. The actual diffuser disclosed herein also includes third and fourth tubular sections. The third tubular section is located immediately downstream from the second tubular and defines an axially extending inner passageway having a uniform cross section along its entire length. The fourth tubular section is located immediately downstream from the third section and defines an axially extending inner passageway having a diverging cross section along its entire length from its upstream end to its downstream end. As will be described in detail hereinafter, these various sections cooperate with one another so that as the stream of liquid, at high velocities, passes therethrough it always remains fully attached to the tubular sections about the entire perimeter of the stream.

The diffuser assembly just described briefly above is especially suitable for use in a dye laser amplifier in which a continuous replenished supply of dye is excited by a first light beam in order to amplify the intensity of a second different light beam passing through the dye. This particular amplifier includes a support vessel containing a dye cell defining a dye chamber through which a continuous stream of dye is caused to pass along with means for directing the dye stream along a particular path through the chamber from the chamber's upstream end to its downstream end. The diffuser assembly is disposed in this particular path immediately downstream of the dye chamber.

Additional objects, advantages and novel features of the invention will be set forth in the description which follows, and in part will be come apparent to those skilled in the art upon examination of the following or may be learned by practice of the invention. The objects and advantages of the invention may be realized and attained by means of the instrumentalities and combination particularly pointed out in the appended claims.

BRIEF DESCRIPTION OF THE DRAWINGS

The overall dye laser amplifier disclosed herein and particularly its diffuser assembly will be described in more detail hereinafter in conjunction with the drawings wherein:

FIG. 2 is an enlarged view, in axial section, of the diffuser assembly shown in FIG. 1;

FIG. 3 is a view similar to FIG. 2 but illustrating the diffuser assembly rotated 90°;

FIG. 4 is a top plan view of the diffuser assembly illustrated in FIG. 3; and

FIG. 5 is a bottom plan view of the diffuser assembly illustrated in FIG. 3.

DETAILED DESCRIPTION OF THE INVENTION

Figure 1:
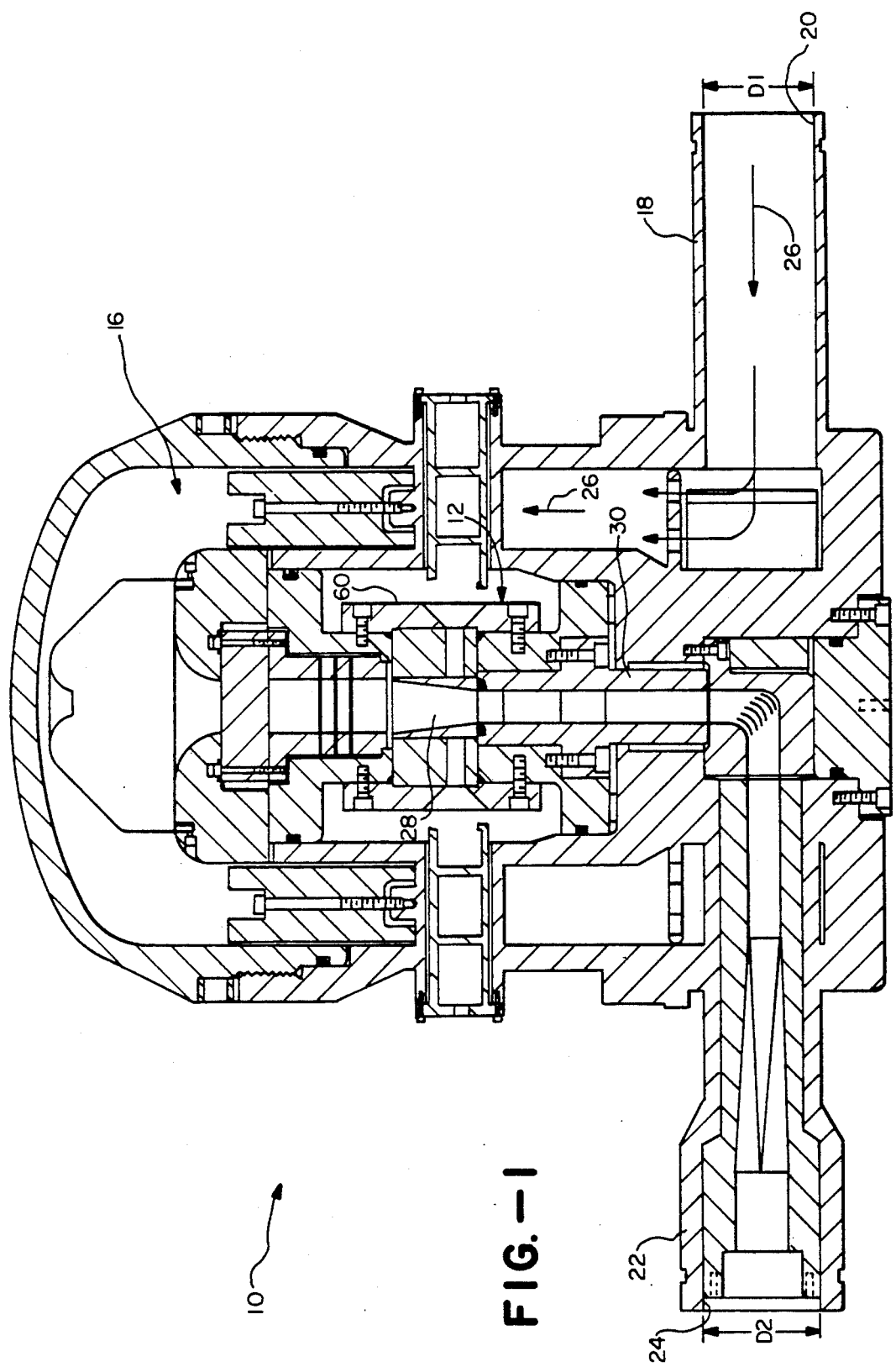
FIG. 1 is an enlarged sectional view, in side elevation, of a support vessel of a dye laser amplifier illustrating in particular its internal components including a dye cell assembly and a diffuser assembly designed in accordance with the present invention.

Reference will now be made in detail to a preferred embodiment of the present invention, an example of which is illustrated in the accompanying drawings, while the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning now to the drawings, wherein like components are designated by like reference numerals throughout the various figures, attention is first directed to FIG. 1 which illustrates a support vessel 10 forming part of an overall dye laser amplifier. As indicated previously, the dye laser amplifier includes a dye cell defining a dye chamber in which a continuous replenished supply of dye solution is excited by a first light beam in order to amplify the intensity of a second different light beam passing through the dye. The dye cell is shown in FIG. 1 at 12 and is contained entirely within an internal chamber 16 defined by support vessel 10. The vessel also includes pipe means 18 defining an inlet 20 into the vessel and pipe means 22 defining an outlet 24 out of the vessel. The inlet 20 is designed to accommodate passage of the above-recited dye stream into vessel chamber 16 before the dye stream enters the dye cell 12 and outlet 24 is designed to accommodate passage of the dye stream out of the vessel. The dye stream itself is diagrammatically represented by the arrows 26 in FIG. 1.

As described in the above-recited copending applications, dye stream 26 initially enters vessel 16 after it first passes through inlet 20 and thereafter flows into and through dye cell 12 including specifically its dye chamber which is shown at 28 in FIG. 1. Immediately thereafter, the stream flows through the diffuser assembly 30 which is designed in accordance with the present invention (as will be described hereinafter) and ultimately out of the support vessel through outlet 24. In an actual working embodiment, the flow rate through vessel 10 is greater than 100 gallons per minute and its velocity through dye chamber 28 is greater than 330 feet per second. Other details of vessel 10 and the components contained therein, except for diffuser 30, can be found in the above-recited copending applications.

Turning now to FIGS. 2–5, attention is directed to diffuser 30 which, as stated above, is designed in accordance with the present invention. More specifically, as will be described in detail below, this diffuser is specifically designed so that, as the dye stream flows therethrough, the dye stream always remains fully attached to the internal wall defining the diffuser assembly, even though the dye stream's flow rate and velocity are quite high.

Referring specifically to FIGS. 2 and 3, diffuser 30 is shown including a generally tubular, axially extending integrally formed housing 32 including an integrally formed, radially outwardly extending circumferential support flange 34 defining bolt openings 36 designed to receive cooperating bolts so as to mount the overall diffuser assembly in its operating position within support vessel 10, as illustrated in FIG. 1. As best illustrated in FIG. 1, diffuser housing 32 may be functionally divided into four axially extending tubular sections, a first upstream-most tubular section 32a, a second tubular section 32b located immediately downstream of section 32a, a third tubular section 32c located immediately downstream from section 32b and downstream-most tubular section 32d located immediately downstream from tubular section 32c. These sections together define a combined axially extending passageway 36 extending from the upstream end of diffuser body 32 to its downstream end. The passageway is specifically designed to slow down the dye stream in a stable manner as the latter passes out of the dye chamber forming part of the dye laser amplifier illustrated in FIG. 1, as will be described in more detail hereinafter. More specifically, as will be seen below, as the dye stream passes through passageway 36 it slows down from a relatively high velocity to a much slower velocity. For example, in an actual working embodiment, the dye stream enters the diffuser at a velocity of 330 feet per second and it exits it at a velocity of 75 feet per second. At the same time, the combined passageway is configured to ensure that as the dye stream flows therethrough it always remains fully attached to the internal wall defining the passageway and that does so about the entire circumference of the dye stream, that is, at all points around its cross section. As will be seen below, this is accomplished by designing the cross sectional configuration of the passageway 36 along each of the diffuser sections 32 in a particular way.

It should be noted at the outset that diffuser assembly 30 is a two-dimensional diffuser, that is, it is designed to expand outward in order to slow down the dye stream in two dimensions only. This is best illustrated in FIGS. 2 and 3. In FIG. 2, the combined passageway is shown expanding from its upstream-most end to its downstream-most end. However, the cross sectional configuration of the passageway rotated 90° from its FIG. 2 position is uniform along its entire length, as seen in FIG. 3.

Turning to FIG. 2 specifically, the description of the various sections making up passageway 36 will now be provided. To this end, the passageway may be divided into four sections 36a, 36b, 36c and 36d corresponding to and defined by housing sections 32a, 32b, 32c and 32d, respectively. Passageway section 32a has a uniform cross section along its entire length and may be referred to as a stabilizing section as compared to, for example, the immediately following section 32b which diverges from its downstream end to its upstream end and which acts as a diffusing section. As the dye stream enters passageway section 32a, because of the stream's transition from dye chamber 28 to the diffuser assembly, it tends to display a cross sectional velocity profile which is not uniform due to small misalignments of the dye chamber and the diffuser assembly. This by itself can cause the stream to separate from the diffuser (e.g., the internal wall defining its passageway) either immediately or eventually as the stream is diffused (e.g., caused to slow down as it flows through the passageway).

Passageway section 32a is sufficiently long so that by the time the dye stream enters passageway section 32b it does so with a cross sectional velocity profile which is substantially uniform. This is because the non-diverging nature of passageway section 32a allows the dye stream to stabilize, at least to the extent of allowing its cross sectional velocity profile to become more uniform. By selecting the appropriate length for passageway section 32, the dye stream's cross sectional velocity can be made to be substantially uniform as it enters section 32b. In an actual working embodiment, passageway section 32a is twice as long as it is wide (in the cross sectional direction illustrated in FIG. 2). Specifically it is 0.429 inch long and 0.143 inch wide. The actual passageway section (and the entire passageway itself) is 0.685 inch wide along its entire extent in the direction illustrated in FIG. 3.

In a preferred embodiment, passageway section 32a is slightly larger than the exit from dye chamber 28. In this way, the overall diffuser assembly may be more readily aligned with the dye chamber than would be possible if the entry to diffuser assembly were identical in size to the exit end of the dye chamber.

Referring now to passageway section 32b, this section is designed so that as the dye stream passes through it the dye stream remains fully attached thereto about its entire circumference. This is accomplished first by ensuring that the dye stream enters this section with a substantially uniform cross sectional velocity profile, as discussed immediately above. In addition, the diverging configuration of passageway section 32b is designed so as operate below what is referred to as a "Line of First Appreciable Stall (LOFAS)". More specifically, the LOFAS refers to the point within an expander at which the stream first begins to stall (e.g., separate from its wall). This is described fully in the publication entitled OPTIMUM DESIGN OF STRAIGHT-WALLED DIFFUSERS by S. J. Kline, D. E. Abbott and R. W. Fox. The citation of this publication is *Journal of Basic Engineering*, September 1959, p. 321. This publication not only describes a Line of First Appreciable Stall but also explains how this line can be derived, given the angle of divergence of a particular passageway, its length and entry width. By designing passageway section 32b to operate below this line, and by causing the entering stream to do so with a uniform cross sectional velocity profile, the possibility that the dye stream will separate from passageway section 32b is minimized. In a preferred embodiment, passageway section 32b operates approximately 20% below its LOFAS. In an actual working embodiment, section 32b is 0.998 inch long, its entry width (in the FIG. 2 dimension) is 0.143 inch and its exit width is 0.274 inch, making its total angle of divergence 7.48 degrees. In these figures, it should be apparent that the length to entry width ratio of passageway section 32b is 7:1.

The combination of passageway sections 32a and 32b provide a stable diffuser and thus the dye stream exiting section 32b is stable. However, as the dye stream exits section 32b it does so with a less uniform cross sectional velocity profile than it had upon entering that section. Passageway section 32c, like passageway section 32a, has a uniform cross section along its entire length and serves the same purpose as section 32a. More specifically, passageway section 32c is made sufficiently long so that when the dye stream exits this section it does so with a substantially uniform cross sectional velocity profile. In an actual working embodiment, the length of section 32c is twice the length of its thickness (in the FIG. 2 dimension). Thus, based on the dimensions of passageway section 32b in the actual embodiment, passageway section 32c is 0.783 inch long and 0.274 inch wide in the FIG. 2 dimension.

Still referring to FIG. 2, attention is now directed to passageway section 32d. As a result of passageway section 32c, the dye stream entering passageway section 32d does so with a substantially uniform cross sectional velocity profile. Passageway section 32d is a diffusing section, that is, its cross section diverges continuously from its upstream end to its downstream end. This configuration is designed in the same manner as diverging passageway section 32b, that is, in accordance with the LOFAS defined by the above-recited publication. In a preferred embodiment, section 32d, like section 32b, is designed to operate below its LOFAS, and specifically 20% below it. In an actual working embodiment, passageway section 32d is 2.709 inches long and it has an entry width (as viewed in FIG. 2) of 0.274 inch and an exit width of 0.560 inch, making its total angle of divergence 6.04 degrees.

Overall diffuser assembly 30 has been described as including a first straight section 32a and cooperating diverging section 32b, and a second straight section 32c and a cooperating diverging section 32d. It is to be understood that the overall diffuser assembly could include a single pair of passageway sections 32a, 3b, two pairs of such sections (as illustrated in the figures) or a greater number of such pairs, depending upon the degree to which the stream must be diffused. It is also to be understood that while the diffuser assembly is especially designed for use in a dye laser amplifier as described above, this assembly could be used to act on other fluid streams and in other environments.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. It is intended that the scope of the invention be defined by the claims appended hereto.

What is claimed is:

1. In a dye laser amplifier in which a continuous replenished supply of dye is excited by a first light beam in order to amplify the intensity of a second different light beam passing through the dye, said amplifier including a support vessel containing, a dye cell defining a dye chamber through which a continuous stream of dye is caused to pass, means for directing said second beam into and through said chamber, and means for directing said continuous stream of dye along a particular path through said chamber from the chamber's upstream end to its downstream end, the improvement comprising a generally tubular, axially extending diffuser assembly disposed in said path taken by said dye immediately downstream of said dye chamber, said diffuser assembly including:

(a) a first upstream-most tubular section defining an axially extending inner passageway having a uniform cross section along its entire length, said first tubular section being sufficiently long so that as said continuous stream of dye flows out of said first section it has a substantially uniform cross sectional velocity profile; and (b) a second tubular section which is located immediately downstream from said first section and which defines an axially extending inner passageway having a diverging cross section along its entire length from its upstream end to its downstream end, the inner passageway of said second tubular section having a rectangular cross section which diverges in two dimensions only and being configured such that as said continuous stream of dye flows therethrough it always remains fully attached to the tubular section about the entire circumference of the stream.

2. The improvement according to claim 1 wherein the upstream-most entry into the passageway defined by the first tubular section of said diffuser assembly is slightly larger than the downstream-most end of said dye chamber.

3. The improvement according to claim 1 wherein the length and angle of divergence of the inner passageway defined by said second tubular section are selected such that the second tubular section operates below its Line of First Appreciable Stall.

4. The improvement according to claim 3 wherein said second tubular section operates approximately 20% below its Line of First Appreciable Stall.

5. In a dye laser amplifier in which a continuous replenished supply of dye is excited by a first light beam in order to amplify the intensity of a second different light beam passing through the dye, said amplifier including a support vessel containing, a dye cell defining a dye chamber through which a continuous stream of dye is caused to pass, means for directing said second beam into and through said chamber, and means for directing said continuous stream of dye along a particular path through said chamber from the chamber's upstream end to its downstream end, the improvement comprising a generally tubular, axially extending diffuser assembly disposed in said path taken by said dye immediately downstream of said dye chamber, said diffuser assembly including:

(a) a first upstream-most tubular section defining an axially extending inner passageway having a uniform cross section along its entire length;

(b) a second tubular section which is located immediately downstream from said first section and which defines an axially extending inner passageway having a diverging cross section along its entire length from its upstream end to its downstream end;

(c) a third tubular section which is located immediately downstream from said second tubular section and which defines an axially extending inner passageway having a uniform cross section along its entire length; and (d) a fourth tubular section which is located immediately downstream from said third section and which defines an axially extending inner passageway having a diverging cross section along its entire length from its upstream end to its downstream end.

6. The improvement according to claim 5 wherein each of said first and third tubular sections is sufficiently long so that as said continuous stream of dye flows out of that section it has a substantially uniform cross sectional velocity profile.

7. The improvement according to claim 6 wherein the inner passageway of each of said second and fourth tubular sections is configured such that as said continuous stream of dye flows through that section it always remains fully attached thereto about the entire circumference of the stream.

8. The improvement according to claim 7 wherein the inner passageway defined by each of the second and fourth tubular sections of said diffuser assembly has a rectangular cross section which diverges in two dimensions only.

9. The improvement according to claim 8 wherein the length and angle of divergence of the inner passageway defined by each of said second and fourth tubular sections are selected such that each of those tubular sections operates below its Line of First Appreciable Stall.

10. The improvement according to claim 9 wherein each of said second and fourth tubular section operates approximately 20% below is Line of First Appreciable Stall.

11. A diffuser assembly designed to slow down the flow of a continuous stream of liquid, said diffuser assembly comprising a generally tubular, axially extending diffuser housing adapted to be disposed within the flow path of said liquid stream, said housing including:

(a) a first upstream-most tubular section defining an axially extending inner passageway having a uniform cross section along its entire length;

(b) a second tubular section which is located immediately downstream from said first section and which defines an axially extending inner passageway having a diverging cross section along its entire length from its upstream end to its downstream end;

(c) a third tubular section which is located immediately downstream from said second tubular section and which defines an axially extending inner passageway having a uniform cross section along its entire length; and (d) a fourth tubular section which is located immediately downstream from said third section and which defines an axially extending inner passageway having a diverging cross section along its entire length from its upstream end to its downstream end.

12. The diffuser assembly according to claim 11 wherein each of said first and third tubular sections is sufficiently long so that as said liquid stream flows out of that section it has a substantially uniform cross sectional velocity profile.

13. The diffuser assembly according to claim 12 wherein the inner passageway of each of said second and fourth tubular sections is configured such that as said liquid stream flows through that section it always remains fully attached thereto about the entire circumference of the stream.

14. The diffuser assembly according to claim 13 wherein the inner passageway defined by each of the second and fourth tubular sections of said diffuser housing has a rectangular cross section which diverges in one direction only.

15. The diffuser assembly according to claim 14 wherein the length and angle of divergence of the inner passageway defined by each of said second and fourth tubular sections are selected such that each of the tubular sections operates below its Line of First Appreciable Stall.

16. The diffuser assembly according to claim 15 wherein each of said second and fourth tubular sections operates approximately 20% below its Line of First Appreciable Stall.

* * * * *